APPARATUS FOR ALIGNING A WEB OF PATTERNED SHEET MATERIAL

Original Filed May 4, 1970 7 Sheets-Sheet 1

INVENTORS:
ROBERT W. BENSON
ROBERT G. REED
BY Harrington A. Lackey
ATTORNEY

APPARATUS FOR ALIGNING A WEB OF PATTERNED SHEET MATERIAL

Original Filed May 4, 1970 7 Sheets-Sheet 2

INVENTORS:
ROBERT W. BENSON
ROBERT G. REED
BY Harrington A. Lackey
ATTORNEY

APPARATUS FOR ALIGNING A WEBB OF PATTERNED SHEET MATERIAL

Original Filed May 4, 1970 7 Sheets-Sheet 3

INVENTORS:
ROBERT W. BENSON
ROBERT G. REED
BY Harrington A. Lackey
ATTORNEY

APPARATUS FOR ALIGNING A WEBB OF PATTERNED SHEET MATERIAL

Original Filed May 4, 1970 7 Sheets-Sheet 4

INVENTORS:
ROBERT W. BENSON
ROBERT G. REED
BY Harrington A. Lackey
ATTORNEY

APPARATUS FOR ALIGNING A WEBB OF PATTERNED SHEET MATERIAL

Original Filed May 4, 1970 7 Sheets-Sheet 5

INVENTORS:
ROBERT W. BENSON
ROBERT G. REED
BY Harrington A. Lackey
ATTORNEY

APPARATUS FOR ALIGNING A WEBB OF PATTERNED SHEET MATERIAL

Original Filed May 4, 1970 7 Sheets-Sheet 6

INVENTORS:
ROBERT W. BENSON
ROBERT G. REED
BY Harrington A. Lackey
ATTORNEY

APPARATUS FOR ALIGNING A WEBB OF PATTERNED SHEET MATERIAL

Original Filed May 4, 1970 7 Sheets-Sheet 7

INVENTORS:
ROBERT W. BENSON
ROBERT G. REED
BY Harrington A. Lackey
ATTORNEY

United States Patent Office

Re. 28,148
Reissued Sept. 3, 1974

28,148
APPARATUS FOR ALIGNING A WEB OF PATTERNED SHEET MATERIAL

Robert W. Benson and Robert G. Reed, Nashville, Tenn., assignors to Cutters Machine Company, Inc., Nashville, Tenn.

Original No. 3,627,301, dated Dec. 14, 1971, Ser. No. 34,425, May 4, 1970. Application for reissue Aug. 31, 1972, Ser. No. 285,304
Int. Cl. B65h *29/46*
U.S. Cl. 270—31 11 Claims

Matter enclosed in heavy brackets [ ] appears in the original patent but forms no part of this reissue specification; matter printed in italics indicates the additions made by reissue.

ABSTRACT OF THE DISCLOSURE

A machine for spreading patterned cloth having a longitudinal line or linear division, including a photoelectric line or stripe sensing head, a transversely shiftable cloth support, and an electric motor responsive to the stripe sensing head for moving the cloth support transversely in a direction to maintain a line in said cloth on a true longitudinal course.

BACKGROUND OF THE INVENTION

This invention relates to a cloth spreading machine, and more particularly to a machine for aligning patterned cloth having a longitudinal line, stripe or linear division of color or shade.

The term "stripe" as used in this application, means "stripe," "line," or any other substantially consistent linear division of color, shade, or variation in light, or other radiant energy, reflective surfaces in a web of patterned sheet material, such as striped cloth, checked cloth or plaid cloth.

Edge sensing controls, including photoelectric edge sensing controls, for cloth spreading machines, are well-known in the art. However, it is not believed that a successful machine for spreading and aligning longitudinally stripped cloth has been developed.

Heretofore, longitudinally striped cloth layers had to be aligned by eye, or by aligning the edges of the cloth with edge sensing controls. The accuracy of using edge sensing controls, of course, depends upon the accuracy of the transverse spacing and the parallel relationship between the longitudinal stripes and the longitudinal edges of the cloth.

For garments of higher quality made from striped cloth material, the stripes of separate pieces of the material sewn together or upon each other, such as a pocket upon a shirt, had to be separately aligned and the pieces sewn by hand, or by an individual operator on a separate sewing machine.

SUMMARY OF THE INVENTION

It is therefore an object of this invention to provide an apparatus not only for accurately and sensitively following a longitudinal stripe of a different color or shade in a web of sheet material, but also for maintaining the feed of the web on a true longitudinal course defined by one of the longitudinal stripes in the material.

It is a further object of this invention to provide a cloth spreading machine having a stripe sensing apparatus for accurately laying longitudinally striped cloth so that all the corresponding stripes in the cloth layers are accurately aligned with each other.

The apparatus made in accordance with this invention includes a typical cloth spreading machine having a longitudinally movable spreader frame supporting a cloth supply and a spreader unit and means for driving the web of cloth between the supply and the spreader unit for spreading in layers upon a spreading table. A photoelectric stripe sensing head of a particular design is mounted on the frame to sense any one of the longitudinal stripes in the cloth. A cloth support or guide member is mounted for transverse reciprocable movement and is driven by a reversible electric motor. An electronic control circuit connects the stripe sensing head to the motor. The control circuit transmits an error signal from the sensing head to the motor corresponding to the magnitude and direction of the deviation of the stripe from its predetermined normal course, causing the electric motor to respond in such a manner as to move the cloth guide member in a direction to restore the strip to its normal course.

The apparatus also includes an edge sensing head transversely movable with the cloth guide member and adapted to actuate, through another electronic control circuit, another reversible electric motor which drives a transversely movable carriage supporting a cloth supply roll. This combination of the stripe sensing head, edge sensing head and their respective control circuits, and both a cloth guide member and a cloth roll carriage transversely movable, permits a more sensitive control for gradually and substantially simultaneously, transversely shifting the entire length of the web portion of the cloth, between the supply and spreader unit, to its normal longitudinal course. This shifting of the entire length of cloth carried by the spreading machine avoids twisting or warping of the cloth, not only on the machine but also in the layers spread upon the table.

The apparatus further contemplates a novel stripe sensing head, stripe sensing control circuit and edge sensing control circuit.

DESCRIPTION OF THE PREFERRED EMBODIMENT

Figure 1:
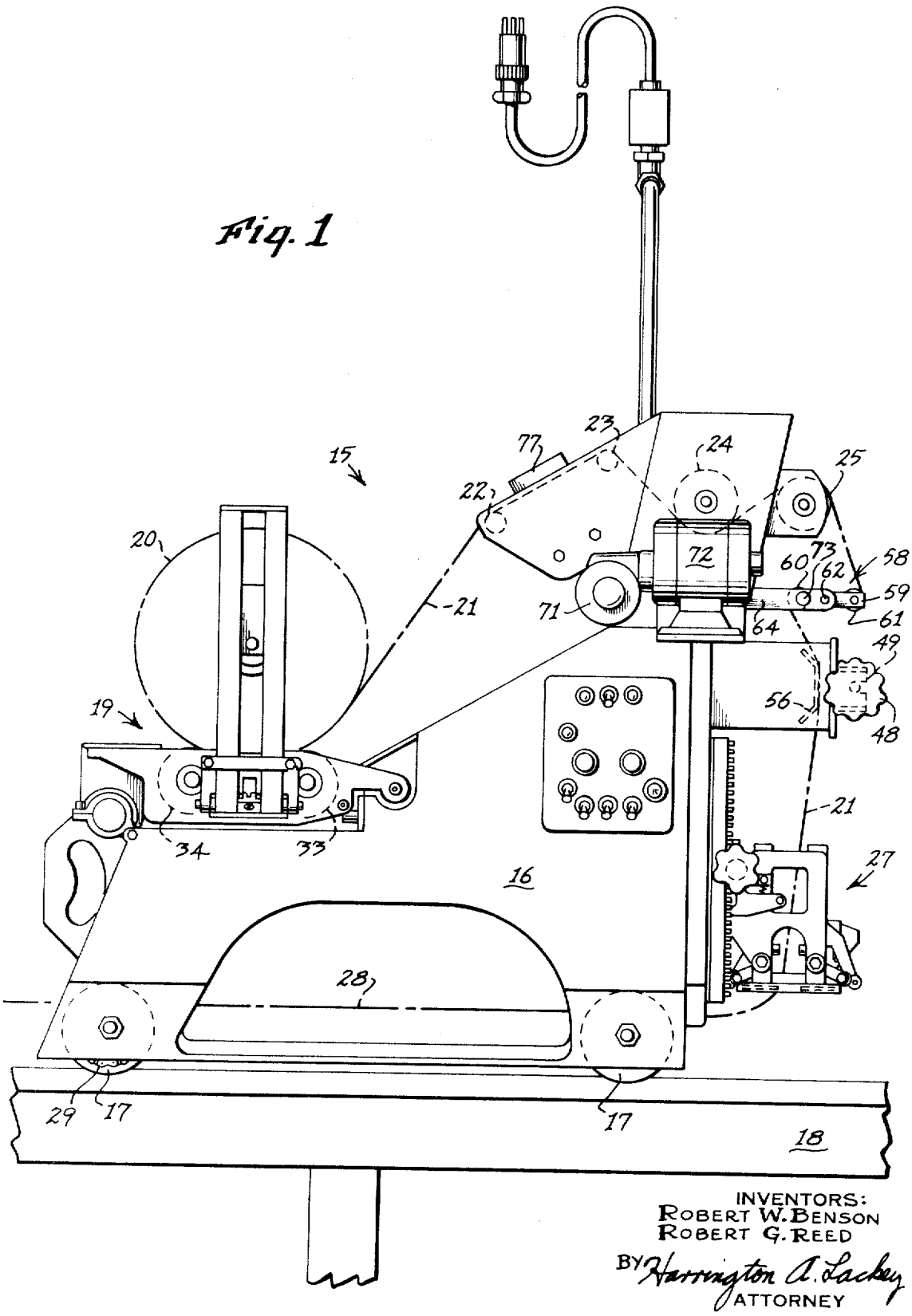
FIG. 1 is a side elevation of a cloth spreading machine incorporating the stripe aligning apparatus made in accordance with this invention.

Referring now to the drawings in more detail, FIGS. 1–4 disclose a cloth spreading machine 15 including a frame 16 mounted on wheels 17 for longitudinal movement over a spreading table 18. Mounted adjacent the rear of the frame 16 is a cloth feed carriage 19 supporting a cloth roll 20. A web 21 of striped cloth is fed from the roll 20 over the guide rods 22 and 23 around the top feed rolls 24 and 25 to the spreader unit 27, where the cloth web 21 is spread upon the table 18 in layers 28.

The frame 16 is moved longitudinally over the table 18 by driving the rear wheels 17 through a chain and sprocket transmission 29, drive shaft 30, and belt transmission 31 from the main drive motor 32 mounted on the frame 16.

The cloth carriage 19 and its feeding machanism is very similar to that disclosed in U.S. Pat. No. 3,400,927, issued to to Thomas W. Martin et al., on Sept. 10, 1968. The carriage 19 includes a pair of feed roller sections 33 and 34 positivey driven through the respective chain and sprocket transmissions 35 and 36 from a common shaft 37. The shaft 37 is transversely reciprocable within, but rotatable with, sleeve 38, to permit transverse movement of the carriage 19 in response to the edge control mechanism, to be described later. The sleeve 38 is, in turn, driven by shaft 39 through chain and sprocket transmision 40 from th electric feed motor 41.

Although not disclosed in the drawings, and forming no part of this invention, the top feed rolls 24 and 25 may also be driven through appropriate drive linkages or transmissions from the feed motor 41.

The main drive motor 32 and the cloth feed motor 41 are also driven by appropriate controls, not shown, which may be of any conventional or convenient design, which form no part of this invention.

Figure 2:
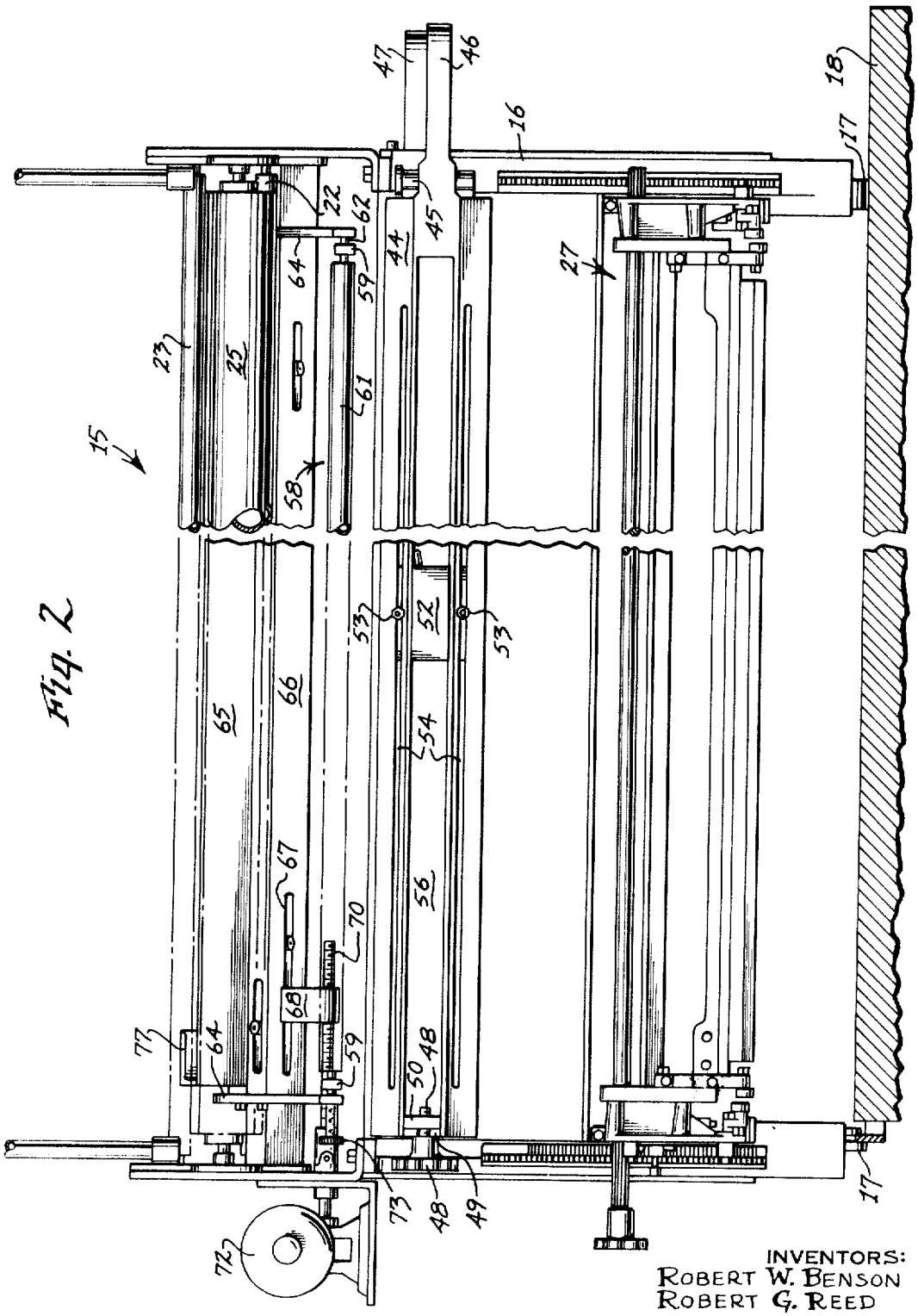
FIG. 2 is a front elevation of the machine disclosed in FIG. 1, with parts broken away and with some of the front guide and feed rollers fragmentarily shown in phantom.
Figure 3:
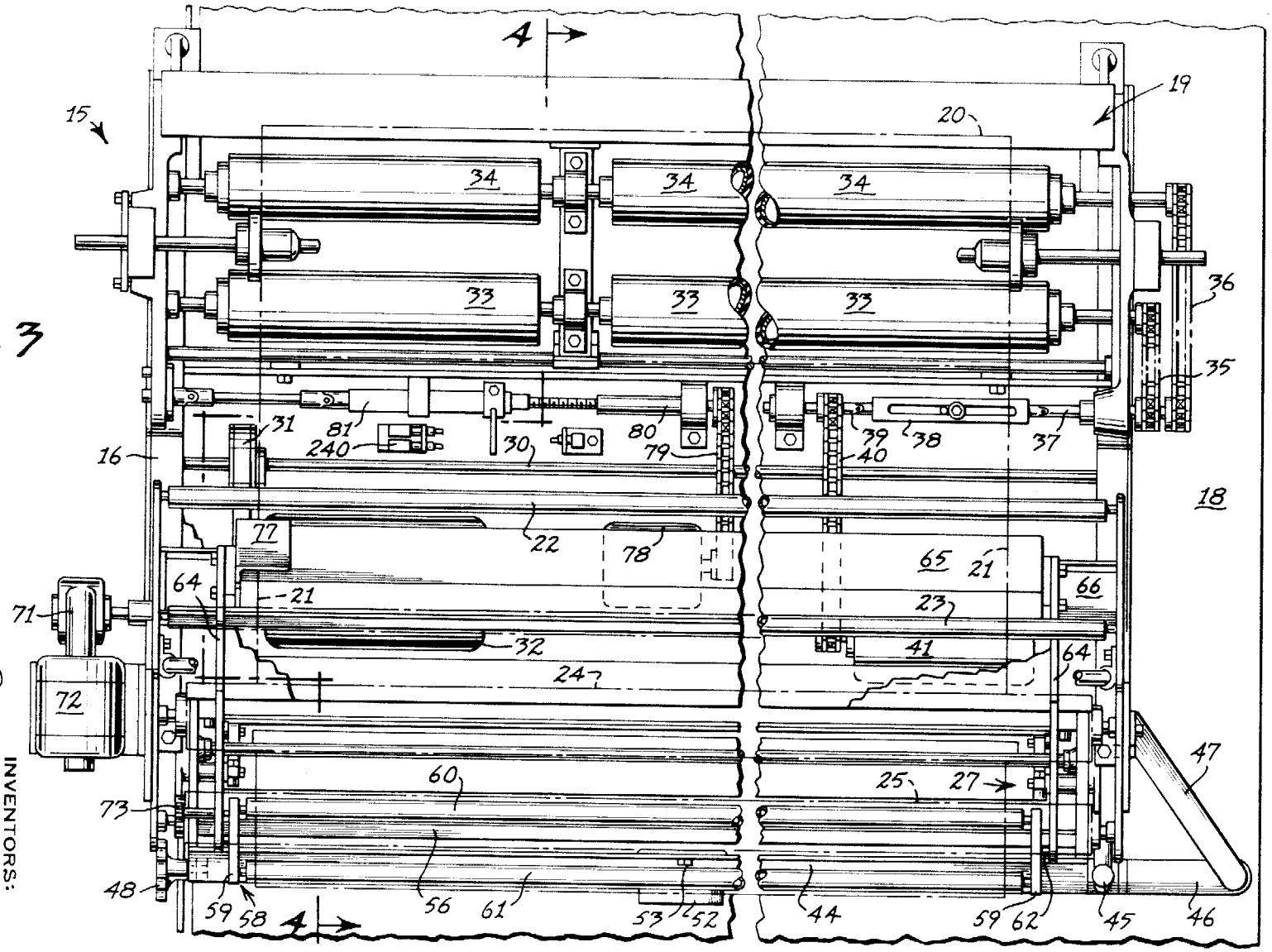
FIG. 3 is a top plan veiw of the machine, with portions broken away.

Mounted in front of the frame 16 between the top feed rolls 24 and 25 and the spreader unit 27 is an elongated stripe sensing head support member 44 entering the entire width of the machine, as best disclosed in FIG. 2. The remote end, or right end as viewed in FIG. 2, of the support member 44 is hinged about a vertical axis by the pintle 45, so that the support member 44 may be swung in a substantially horizontal plane between its operative latched position as disclosed in the drawings, and a forward position away from the frame 16. The effect of the extended leverage or moment of the support member 44 about the pintle 45 is overcome by a counter-balancing extension arm 46 adapted to slide beneath a guide arm 47 fixed to the frame 16. The opposite end of the support member 44 is secured in operative position by a threaded bolt 48 having a hand wheel thereon extending through a fixed forked bracket 49 and threadedly engaging a nut 50 fixed to the proximate end of the support member 44.

Figure 6:
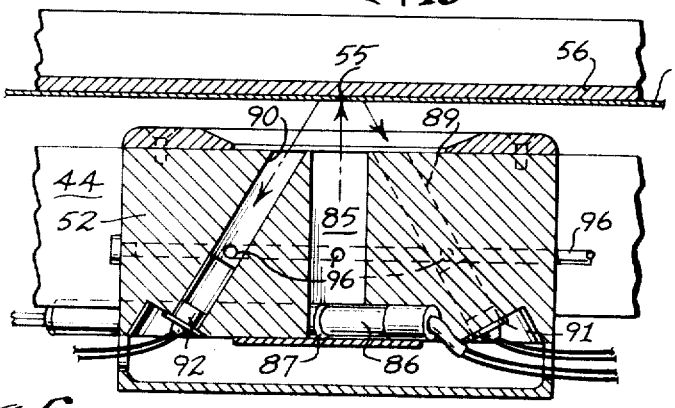
FIG. 6 is a section taken long the line 6—6 of FIG. 5.

The stripe sensing head 52 is mounted upon the support member 44 for adjustable movement longitudinally of the support member 44, but transversely of the spreader frame 16. Projecting forward of the head 52 are a pair of guide bolts 53 slidably received in the elongated guide slots 54 in the support member 44. In this manner, the stripe sensing head 52 may be adjusted transversely of the machine so that it can focus upon any desired longitudinal stripe 55 on the cloth web 21 (FIG. 6). Supporting the web 21 to pass proximate to the stripe sensing head 52 is an elongated backup bar or plate 56.

Mounted above the stripe sensing head support member 44 and below the top feed rolls 24 and 25 is a cloth guide bracket or member 58 also extending transversely across the front of the machine frame 16. The web guide member 58 may comprise a pair of side bars 59. One pair of ends of the side bars rotatably support between them a friction guide roller 50, the surface of which may be of hard rubber or other frictional material. The other pair of ends of the side bars 59 support a smooth guide roller 61. The intermediate portions of the side bars 59 are pivotally mounted by pins 62 to a pair of carrier arms 64 extending generally rearwardly.

The rear ends of the arms 64 are fixed to an elongated carrier 65 mounted for transverse reciprocable movement in a channel-shaped track 66. Fixed to the carrier 65 and depending through an elongated slot 67 in the channel track 66 is a tongue 68 having an internally threaded opening for engaging a screw shaft 70. The screw shaft 70 is reversibly driven to move the carrier 65 in either transverse direction, through a gear reduction transmission 71 by the reversible electric guide motor 72 mounted on the side of the spreader frame 16.

Figure 4:
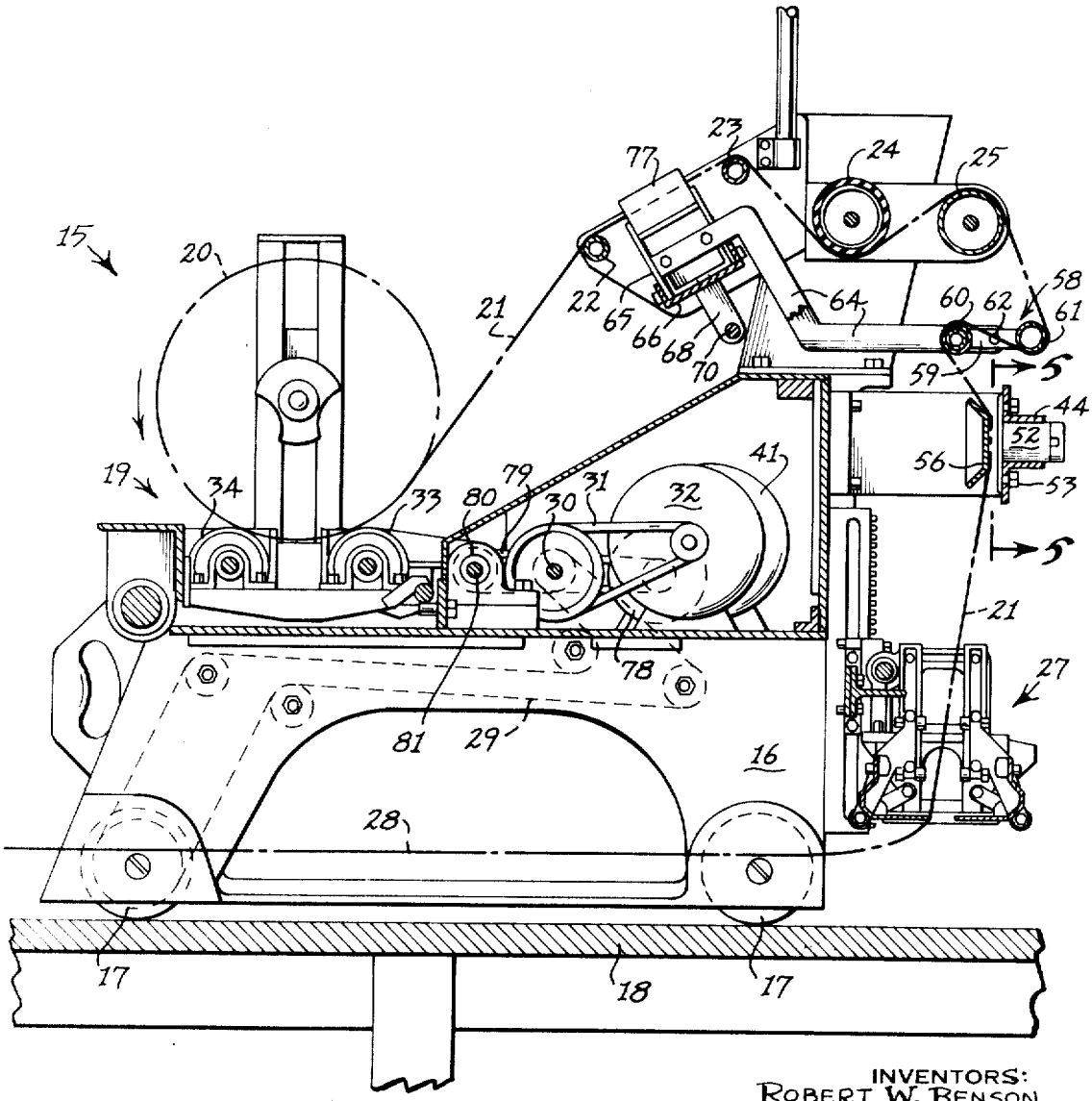
FIG. 4 is a section taken along the line 4—4 of FIG. 3.

The side bars 59 may be rotated about the pivot pins 62 through approximately 180° to reverse the positions of the guide rollers 60 and 61 for threading, and then counter-rotated to the position of FIG. 4, where one of the side bars 59 is latched to the carrier arm 64 by latch pin 73.

Figure 11:
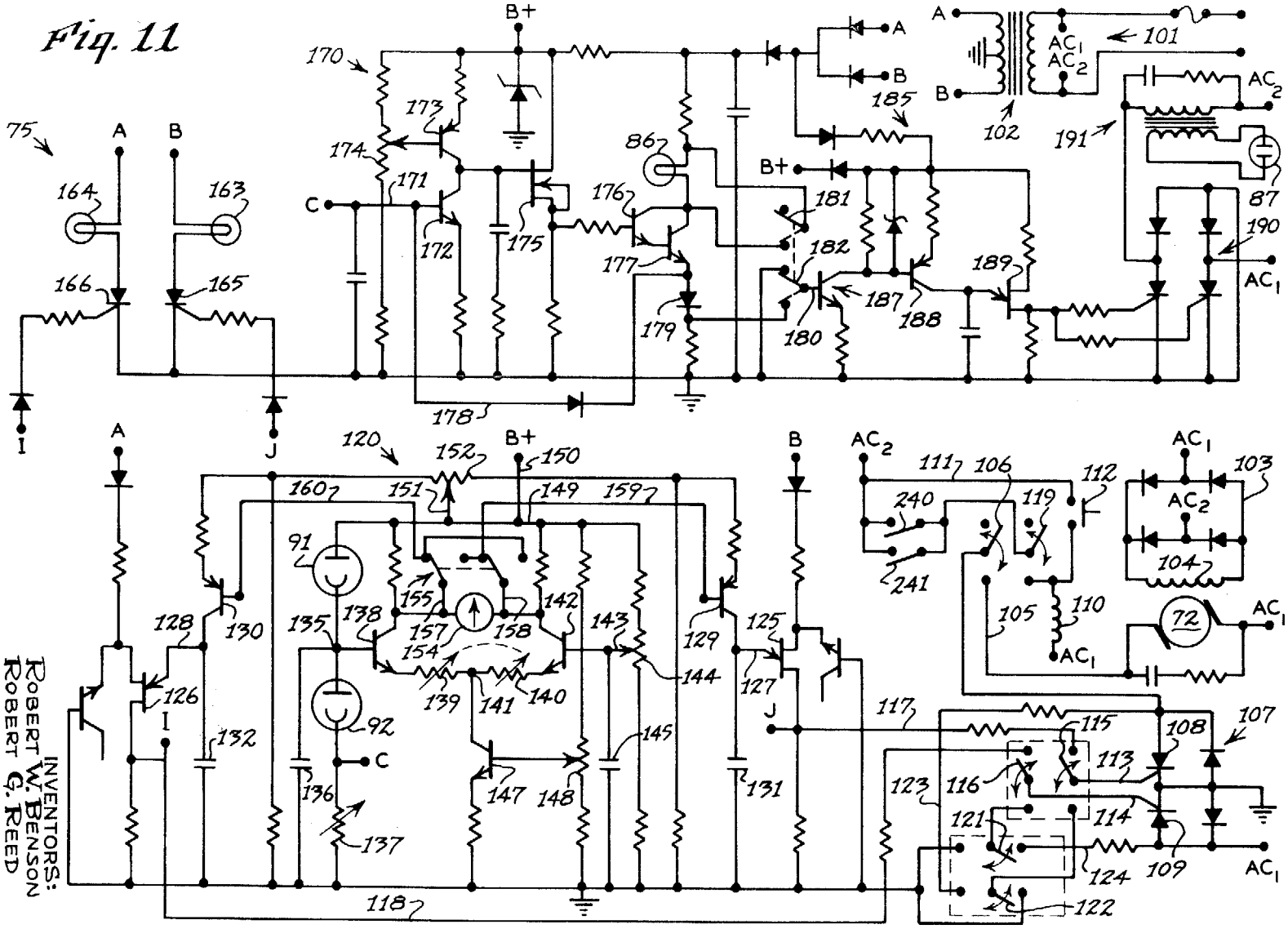
FIG. 11 is a schematic diagram of the stripe sensing and control circuit.

The reversible electric guide motor 72 is operatively connected and responsive to the stripe sensing head 52 through the stripe sensing control circuit 75 disclosed in FIG. 11, to change speed or reverse in order to shift the web guide member 58 at a speed and in a direction to maintain the strip 55 in a predetermined normal alignment with the edge sensing head 52.

In order to effect better control over the entire length of the striped web 21 from the cloth roll 20 to the spreader unit 27, the cloth carriage 19 is also adapted to shift the cloth web 21 transversely substantially simultaneously with the shifting of the guide member 58. In order to effect this double-shifting of the web 21, an edge sensing head 77 is fixed to the carrier 65 in order to sense the edge of the web 21 in a manner quite similar to that disclosed in the above cited Martin Pat. 3,400,927. The edge sensing head 77 is operatively and electrically connected to the electrical reversible cloth carriage motor 78. The cloth carriage motor 78 rotatably drives an internally threaded sleeve 80 through chain transmission 79. Operatively connected to the internally threaded rotary sleeve 80 is a threaded carriage rod member 81 which is fixed to the proximate end of the carriage 19 in order to reciprocably and transversely move the carriage 19 relative to the spreader frame 16.

Figure 12:
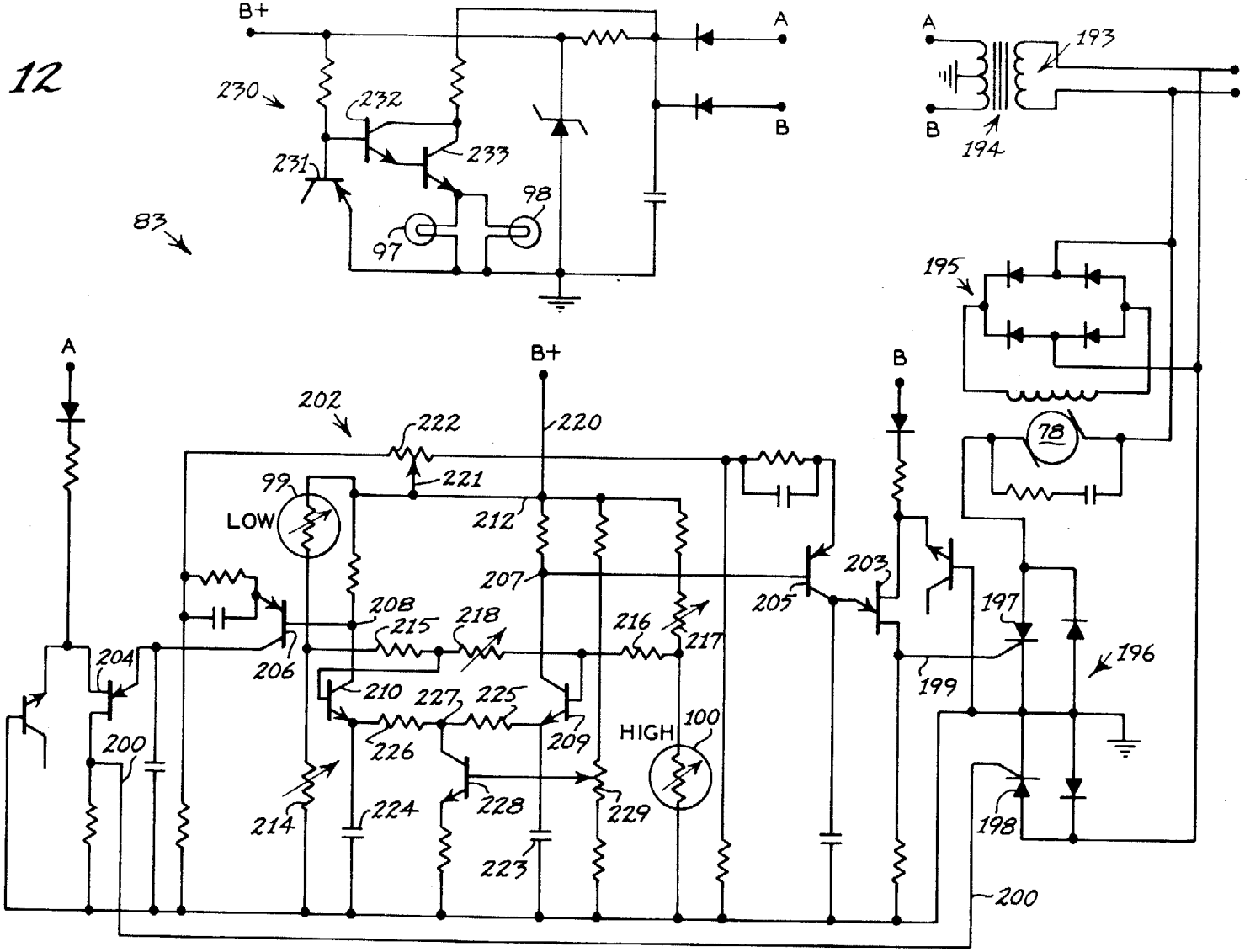
FIG. 12 is a schematic diagram of the edge sensing and control circuit.

The carriage motor 78 is operatively connected to the photoelectric edge sensing head 77 through the edge sensing control circuit 83 disclosed in FIG. 12.

Figure 5:
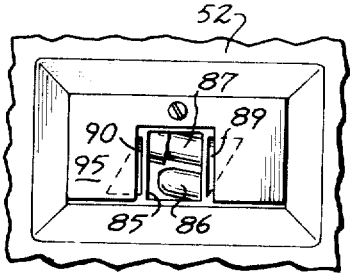
FIG. 5 is an enlarged fragmentary section taken along the line 5—5 of FIG. 4, disclosing the face of the stripe sensing head.

As best disclosed in FIGS. 5 and 6, the stripe sensing head 52 includes a light emitting cavity 85 extending centrally through the head 52 and adapted to direct an incident beam of light from either of the light sources 86 or 87 substantially normal to the plane of the web supported by the back-up plate 56. Light source 86 is a source of white light, while light source 87 is a source of ultra-violet light. As disclosed in FIG. 5, the cross-section of the light cavity 85 is preferably square or rectangular.

Disposed transversely on either side of the light cavity 85 are a pair of light receiving cavities 89 and 90. In order to distinguish between the two light receiving cavities, the cavity 89 will be referred to as the proximate or right cavity, while the cavity 90 will be referred to as the remote or left cavity. The cavities 89 and 90 are adapted to receive therein the photoelectric cells 91 and 92, respectively. The cavities 89 and 90 are disposed at equal angles to the axis of the light cavity 85 to receive beams reflected from the web 21 created by the incident beam from the light emitting cavity 85. Each light receiving cavity 89 and 90 also has a cross-section adapted to converge longitudinally in opposite directions. Specifically, the cross-sections of the light receiving cavities 89 and 90 have the shapes of right-angle triangles with the most acute angles of each directed longitudinally in opposite directions. The purpose of these shapes is to permit the quantity of light receiver in the right cavity 89 to gradually decrease as the light received in the left cavity 90 increases, when the stripe 55 moves from its normal course transversely toward the right of FIG. 6. Conversely, as the stripe moves toward the left of FIG. 6, then the quantity of reflected light decreases in the cavity 90 as it increases in the cavity 89. Thus, the reverse triangular shapes of the cavities 89 and 90 provide a more sensitive detection of the transverse deviation of the longitudinal strip 55.

Figure 7:
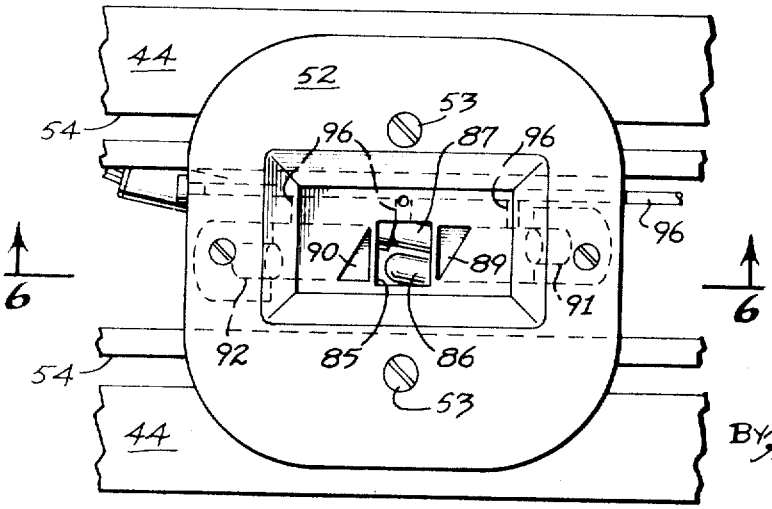
FIG. 7 is a fragmentary face view of the stripe sensing head, disclosed in FIG. 5, with the addition of a face mask.

For more sensitive detection, the cross-section of the triangular cavities 89 and 90 may be effectively reduced by a masking face plate 95, as disclosed in FIG. 7. In this modification, as disclosed in FIG. 7, the triangular shape of the light receiving cavities 89 and 90 does not materially affect the reflected light beams.

If desired, air passages 96 may be provided through the head 52 to permit the introduction of compressed air in order to blow lint out of the light cavities 85, 89 and 90.

Although the white light 86 is generally sufficient for detecting the stripes on most striped materials, nevertheless the ultra-violet light source 87 is employed for more sensitive detection of slight variations in shade, color or light reflective surfaces. For example, the ultraviolet light 87 might be used for creating a reflected light pattern on a web of cloth 21 having a stripe 55 which is only a slightly darker blue than the blue background of the cloth 21.

Figure 9:
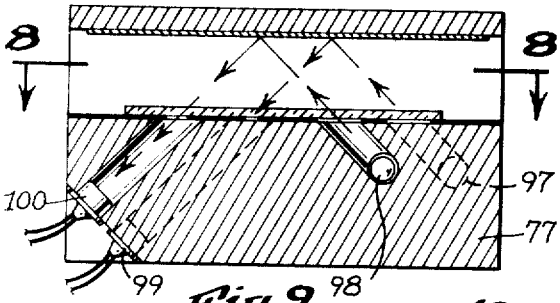
FIG. 9 is a section taken long the line 9—9 of FIG. 8.
Figure 10:
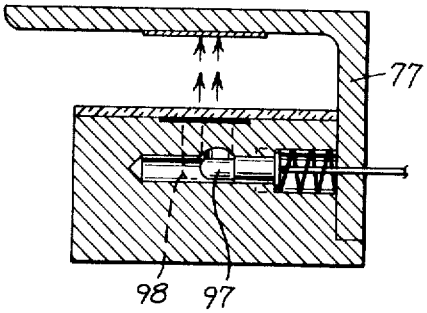
FIG. 10 is a section taken along the line 10—10 of FIG. 8.
Figure 8:
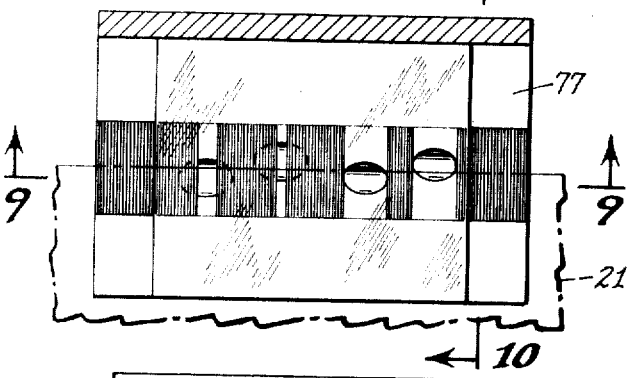
FIG. 8 is an enlarged fragmentary top plan section of the edge sensing head, taken along the line 8—8 of FIG. 9.

The edge sensing head 77 disclosed in FIGS. 8–10 is substantially identical to the edge sensing head disclosed in U.S. Pat. 3,461,302 of Robert W. Benson et al., issued Aug. 12, 1969. The edge sensing head 77 includes the outer light source 97, inner light source 98, outer photoelectric cell 99 and inner photoelectric cell 100. The incident and reflected light beams from the outer light source 97 are normally not obscured by the edge portion of the web 21, while the incident light beam from the inner light source 98 is normally covered by the web 21.

Referring now more particularly to FIG. 11, the stripe sensing control circuit 75 includes a power supply circuit 101 including a transformer 102 having a primary coil and a divided secondary coil having contacts A and B. A motor field bridge circuit 103 is connected across the primary side of the supply circuit 101 to energize the field coil 104 for the guide motor 72. Current is supplied to the armature of guide motor 72 through the connections AC1 from one side of the primary supply circuit 101. The other side of the motor armature 72 is connected through the motor circuit 105 and relay switch 106 to the SCR bridge circuit 107, including SCR's 108 and 109. The other side of the SCR bridge circuit 107 is also connected to the contact AC1. The motor starting relay switch 106 is controlled by the relay coil 110 in the starting circuit 111 including manual momentary start switch 112 and holding relay switch 119. The signal or biasing leads 113 and 114 for the SCR's 108 and 109 are connected through manual double-pole, double-throw (DPDT) switchs 115 and 116, respectively, which, in one position, contact the output signal leads 117 and 118, respectively, from the balanced signal circuit 120.

In the opposite closed position, the DPDT switches 115 and 116 connect signal leads 113 and 114 to another set of DPDT switches 121 and 122. When the switches 121 and 122 are moved to the left set of contacts disclosed in FIG. 11, SCR 109 is grounded, while the signal lead 113 is connected to the motor side of the SCR bridge 107. When the switches 121 and 122 are moved to the opposite or right position the SCR signal lead 113 is grounded, while the signal lead 114 is connected to the opposite side of the bridge circuit 107 from the motor 72. Thus, when the switches 121 and 122 are energized, the motor 72 may be energized in either direction by closing the switches 121 and 122 to the corresponding left or right set of contacts. In this manner, the guide member 58 may be moved transversely in either direction manually to locate the stripe sensing head 52 in alignment with the desired stripe 55, before the frame 16 is started.

The output signal leads 117 and 118 are connected to the unijunction transistors 125 and 126, respectively, each supplied with current from the divided voltage secondary of the transformer 102 through the contacts B and A, respectively. The bias leads 127 and 128 of the unijunction transistors 125 and 126 are connected to output transistors 129 and 130, and are also connected to ground through the timing capacitors 131 and 132.

The photoelectric cells 91 and 92 are connected together in the signal circuit 120 through the junction 135. The junction 135 is connected to ground through capacitor 136, while the photoelectric cell 92 is connected to ground through the light intensity potentiometer 137. Also connected to the junction 135 is the base of the transistor 138. The emitter of the transistor 138 is connected through the ganged gain potentiometers 139 and 140 and junction 141 to the emitter of transistor 142. The base of transmitter 142 is connected to the adjustable wiper 143 of the balance control potentiometer 144. The wiper 143 is also connected to ground through capacitor 145. The junction 141 is also connected to ground through the collector and the resistive emitter circuit of the transistor 147. The base circuit of the transistor 147 is connected to the adjustable wiper of the dead-zone potentiometer 148.

The resistors in the potentiometers 144 and 148 are connected in parallel with the photoelectric cell 91 and the resistive collector circuits of the transistors 138 and 142 through junction lead 149. The junction lead 149 is connected to the B+ supply lead 150 and to the adjustable wiper 151 of the internal balance potentiometer 152. The output or collector leads from each of the transistors 138 and 142 are connected to a meter 154 and also to a DPDT reversing phase switch 155. In its upper closed position, as viewed in FIG. 11, the phase switch 155 connects the collector lead 157 to the base lead 160 and the collector lead 158 to the base lead 159. When the switch 155 is turned to its down position, the connections are reversed.

It will thus be seen that the signal circuit 120 may be set and balanced by the different potentiometers to produce a zero error signal when the photocells 91 and 92 are energized by the reflected light beams from the web 21 when the stripe 55 is aligned on its true course. However, any transverse deviation of the line 55 from its true course in one direction, will increase the resistance of one photocell, while decreasing the resistance of the other photocell, thereby establishing an error signal in the signal circuit 120, of a magnitude proportional to the amount of stripe deviation. An output signal then energizes the corresponding SCR 108 or 109 to drive the guide motor 72 in a direction corresponding to the direction of the error signal, and at a speed proportional, or corresponding to the magnitude of the error signal. Accordingly, the motor 72 will be driven in a direction to restore the stripe 55 to its true course, and at a speed depending upon the amount of deviation of the stripe 55 from its normal course. The movement of the web guide member 58 will be more rapid for greater stripe deviation, and slower for smaller deviations. Moreover, the speed of the guide member 58 gradually decreases as the stripe 55 approaches its normal course.

The speed of the guide motor 72 is determined by the timing of the firing or biasing of the SCR 108 or 109 relative to the cycle of the alternating current passing through the SCR's. Thus, when the SCR 108 is fired with an output signal or pulse through lead 117 and 113 early in the A.C. cycle, the SCR 108 conducts longer to increase the speed of the motor 72. By timing the firing of the SCR 108 later in the A.C. cycle, the motor speed is reduced. The timing depends upon the degree of unbalance in the signal circuit 120 which depends upon the amount of variation in the resistances of the photocells 91 and 92. The timing is effected through the delayed discharges of the corresponding capacitor 131 or 132.

By varying the resistance of the dead-zone potentiometer 148, the lateral play or deviation of the stripe 55 is determined before controlled restorative movement of the web 21 commences.

The stripe sensing control circuit 75 may also be provided with indicator lights 163 and 164 including SCR's 165 and 166 and supplied with voltage through contacts A and B from the divided voltage secondary circuit of the transformer 102. The biasing leads of the SCR's 165 and 166 are connected through contacts J and I respectively, to the output signal leads 117 and 118, so that the lights 163 and 164 are fired simultaneously with the respective SCR's 108 and 109 to indicate the direction and magnitude of deviation of the stripe 55 from its normal course.

The stripe sensing control circuit 75 also includes the light intensity control circuit 170 for energizing the white light source or bulb 85 and the ultra-violet light source or bulb 87.

The light circuit 170 is connected through contact C to the signal circuit 120 between the photoelectric cell 92 and the light intensity potentiometer 137. Thus, a signal is fed to the light circuit 170 in proportion to the intensity of the reflected light beams received by the photocells 91 and 92. If the intensity of the reflected beam is higher than would normally be reflected by the white light 86, for example, indicating that other sources of light are contributing to the reflected beams, then a stronger signal than normal is fed to the light circuit 170 through input lead 171 to correspondingly increase the bias on the amplifying transistors 172, 173, 176 and 177, to reduce the energy or voltage of the white light 86 in order to maintain a fairly constant intensity for the reflected light beams received by the photoelectric cells 91 and 92.

On the other hand, when a reflected light beam is weaker than normal, such as where the web material 21 is of a darker background color, then a weaker signal is transmitted to the light circuit 170 causing the light intensity control circuit 170 to provide a higher voltage to the white light 86 to create an emitted light beam of higher intensity until the intensity of the reflected light beam is restored to its approximate constant value.

Light intensity control circuit 170 is also designed to permit energization of either the white light 86 or the ultraviolet light 87. This is accomplished by the manually operated DPDT selective switches 181 and 182. When the switches 181 and 182 are in their solid-line position as disclosed in FIG. 11, the ultra-violet light 87 is off, and the white light 86 is on. Moreover, the reflected beam signal transmitted through the contact C affects only the intensity of the white light 86.

When the switches 181 and 182 are moved to their dashed-line positions, the white light 86 is short-circuited, so that it is de-energized, and the switch 182 connects the light intensity control elements of the circuit 170 to the ultra-violet light control circuit 185. When the switch 182 is in its solid-line position, the ultra-violet light control circuit 185 is grounded, so that the ultra-violet light 87 is de-energized.

The light intensity control circuit 170 includes the signal input lead 171 to the base of the amplifier transistor 172. The collector of transistor 172 is connected to the collector of transistor 173, whose base circuit is connected to the wiper of the potentiometer 174. The light circuit 170 also includes a unijunction transistor 175 and a pair of transistors 176 and 177 connected as shown in the circuit diagram of FIG. 11. The input lead 171 is also connected to an input lead 178 which bypasses the transistors 176 and 177 and is connected through diode 179 and switch 182 to the input lead 180 of the ultra-violet light control circuit 185. The control circuit 185 includes amplifying transistors 187, 188 and unijunction transistor 19 connected as disclosed in the circuit diagram. The output of unijunction transistor 189 is supplied to the bridge circuit 190 coupled to the ultra-violet light transformer 191, as shown in the circuit diagram of FIG. 11.

The edge sensing control circuit 83 also includes a power supply circuit 193 including transformer 194 which has a divided voltage secondary coil, similar to the stripe sensing circuit 75. The motor field circuit 195 and the SCR bridge circuit 106 for controlling the direction and speed of the carriage motor 78 are also practically identical to the corresponding circuits 103 and 107 in the stripe sensing circuit 75. The SCR's 196 and 198 have their signal leads 199 and 200 connected to the outputs of the balanced signal circuit 202. The signal circuit 202 includes the unijunction transistors 203 and 204 supplied with power through the contacts B and A, respectively, from the voltage divided secondary of the transformer 194. The bias leads to the unijunction transistors 203 and 204 are connected to output transistors 205 and 206, the bases of which are connected to junctions 207 and 208. The collector leads of the balanced transistors 209 and 210 are connected to the junctions 206 and 208 and through resistors to a common junction lead 212. Photoelectric cell 99 is connected to junction lead 212 and also through the potentiometer 214 to ground. Photocell 99 is also connected through resistor 215 to the base circuit of transistor 210. Photoelectric cell 100 is grounded and connected through resistor 216 of the base circuit of transistor 209, and to the junction lead 212 through potentiometer 217. The resistors 215 and 216 are connected in series with potentiometer 218. The junction lead 212 is connected to the B+ supply circuit 220 and through a wiper 221 to balance control potentiometer 222.

The emitters of transistors 209 and 210 are connected to ground through the respective capacitors 223 and 224. The emitter circuits of transistors 209 and 210 are also connected to ground through resistors 225 and 226, junction 227 and transistor 228. The base circuit of transistor 228 is connected through a wiper to dead-zone potentiometer 229.

The edge sensing control circuit 83 also includes a light intensity control circuit 230 having amplifier transistors 231, 232 and 233 connected to both inner and outer light sources 97 and 98 in parallel to maintain a constant light intensity.

Thus, the carriage motor 78 is changed in direction and speed by the SCR bridge circuit 196 in response to and substantially simultaneous with the change in the direction and magnitude of the error signals developed within the balanced signal circuit 202, in a manner similar to the operation of the stripe sensing signal circuit 120, SCR bridge 107 and guide motor 72. The unbalanced signal is created by the variations in resistance of the photocells 99 and 100 resulting from the variations in the amount of reflected light received by the photocells.

It will be understood that other types of gating circuits or electronic gating valves might be substituted for the SCR's.

In the stripes sensing control circuit 75, the guide motor 72 may be de-energized when the cloth roll 20 is exhausted of cloth 21, and the circuit to the cloth feed motor 41 is interrupted. When the cloth roll 20 is exhausted, the edge control 77 causes the carriage 19 to move toward the proximate side of the frame 16 (left side of FIG. 3) until the no-cloth switch 240 is engaged and opened, in the manner described in the above Martin Pat. 3,400,927. Then when the manual cloth feed switch 241 is opened, the holding relay coil 110 is de-energized to open the holding relay 113 and stop the guide motor 72.

What is claimed is:

1. An apparatus for spreading a web of cloth, having a longitudinal stripe thereon, on a surface comprising:

(a) a frame movable longitudinally over said surface, (b) a cloth supply on said frame, (c) spreader means on said frame for spreading a web of cloth on said surface, (d) means guiding a web of cloth from said supply to said spreader means, (e) means for moving said frame longitudinally over said surface, (f) a stripe sensing head mounted on said frame adjacent the path of said web and adapted to sense the stripe on said web, (g) means mounting said guiding means for reciprocable transverse movement to move said web transversely of said sensing head, (h) motive means for reciprocably transversely moving said guiding means, and (i) control means responsive to said stripe sensing head to actuate said motive means to move said guiding means in a direction to maintain said stripe in alignment with a normal course determined by said sensing head.]

[2. The invention according to claim 1 in which said cloth supply comprises a transversely reciprocable cloth carriage, carriage motive means, an edge sensing head for sensing the edge of said web, edge sensing control means responsive to said edge sensing head to move said carriage motive means in a direction to maintain said edge on a normal longitudinal course, link means connecting said edge sensing head to said web guiding means for simultaneous transverse movement.]

[3. The invention according to claim 2 further comprising a carrier, said edge sensing head being fixed to said carrier, track means supporting said carrier for transverse movement, said link means connecting said carrier to said web guiding means.]

[4. The invention according to claim 3 in which said link means comprises arm means rigidly fixing said carrier to said web guiding means, said motive means for reciprocably moving said guiding means comprising screw shaft means operatively coupled to said carrier, an electrical motor for driving said screw shaft means.]

[5. The invention according to claim 1 further comprising an elongated striper head support member extending transversely of said frame in front of said web path, said stripe sensing head being mounted for transverse adjustment upon said support member, means hingedly connecting one end of said support member to one side of said frame for swinging movement about a vertical axis, and means for latching the opposite end of said support member to the other side of said spreader frame.]

[6. The invention according to claim 2 in which said carriage motive means comprises a reversible electrical carriage motor, and said motive means for said guiding means comprises a reversible electrical guide motor, said control means comprising a stripe sensing electrical circuit connected to said guide motor and responsive to said stripe sensing head, said edge sensing control means comprising an edge sensing electrical circuit connected to said carriage motor and responsive to said edge sensing head, each of said sensing circuits being adapted to vary the speed and direction of said guide motor and said carriage motor, respectively, corresponding to the magnitude and direction of the error signals detected by said stripe sensing head, and by said edge sensing head, respectively.]

[7. The invention according to claim 6 in which said stripe sensing head comprises a light source, and a left photoelectric cell and a right photoelectric cell spaced on opposite sides of said light source, said light source and said photoelectric cells being connected in said stripe sensing circuit, so that deviations in the intensity of reflected light from the reflected light pattern of a predetermined stripe course on said web is converted into corresponding error signals causing said guide motor to restore said stripe to said normal course.]

[8. The invention according to claim 7 in which said light source comprises a white light and an ultra-violet light, and selective switch means for energizing only one of said lights at a time.]

[9. The invention according to claim 7 further comprising a light intensity control circuit in said stripe sensing circuit adapted to receive a signal from at least one of said photoelectric cells corresponding to the intensity of illumination received by said photoelectric cell, said intensity control circuit varying the voltage of said light source in response to said signal to maintain a light beam reflected from said web to said sensing head of substantially constant intensity.]

[10. The invention according to claim 7 in which said stripe sensing circuit is set to operate when the area on one side of a line on said normal course is darker than the area on the other side of said line, and reversing switch means operative to set said stripe sensing circuit to operate when the area on one side of said line is lighter than the area on the other side of said line.]

[11. An apparatus for aligning a longitudinal stripe in a web of sheet material comprising:

(a) means supporting said web for movement in a longitudinal path, (b) means for shifting said supporting means transversely, inwardly or outwardly from a normal stripe position, (c) a stripe sensing head having a light emitting opening, and a left light receiving opening and a right light receiving opening spaced transversely on opposite sides of said light emitting opening, (d) means mounting said sensing head so that said light openings face said web path, (e) a light source in said sensing head directing an incident beam through said light emitting opening upon a web in said web path, (f) a left photoelectrical cell in said head for receiving a reflected beam through said left receiving opening, (g) a right photoelectric cell in said head for receiving a reflected beam through said right receiving opening, (h) electronic control means responsive to said photoelectric cells and operatively connected to said shifting means to move said supporting means to maintain said stripe substantially in said normal stripe position.]

[12. The invention according to claim 11 in which said left light receiving opening converges longitudinally in one direction and said right light receiving opening converges longitudinally in the opposite direction.]

[13. The invention according to claim 11 in which said light source comprises a white light and an ultra-violet light, and selective switch means for energizing one or the other of said lights.]

[14. The invention according to claim 11 in which said electronic control means comprises a balanced signal circuit including said photoelectric cells, said signal circuit producing an error signal corresponding to the magnitude and direction of the lateral deviation of the sensed stripe from the normal stripe position, said shifting means comprising a reversible electrical guide motor, a motor control circuit operatively connected to said motor and to said signal circuit, said motor control circuit being responsive to said error signal to correspondingly change the speed and direction of said guide motor.]

[15. The invention according to claim 14 in which said motor control circuit comprises a bridge circuit including a forward electronic gate and a reverse electronic gate said error signal being adapted to energize a corresponding gate depending upon the direction of said deviation and for a length of time corresponding to the magnitude of said deviation.]

[16. The invention according to claim 15 further comprising timing means in said signal circuit for controlling the timing of the energization of said gates.]

[17. The invention according to claim 16 in which said timing means comprises balanced capacitors in said signal circuit.]

[18. The invention according to claim 14 further comprising a reversing switching in said signal circuit for reversing the direction of the error signal for selective sensing of a line having a dark area on one side and a light area on the other side and a line having a light area on one side and a dark area on the other side.]

[19. The invention according to claim 11 further comprising a light intensity control circuit connected to said light source and to said electronic control means, said light intensity control circuit being responsive to signals from said electronic control means varying with the intensity of said reflected light beams to change the energy of said light source in order to maintain a substantially constant intensity of said reflected light beams for any position of said stripe relative to said sensing head.]

[20. An apparatus for maintaining a web of sheet material on the same normal longitudinal course as a longitudinal line on said web, comprising:

(a) means supporting said web for movement in a longitudinal path, (b) electrical motive means for shifting said supporting means transversely, inwardly or outwardly from said normal course, (c) a photoelectric sensing head, including a light and at least one photoelectric cell sensing said line, (d) a motor control circuit including a bridge having a forward electronic gate and a reverse electronic gate, connected to said electrical motive means, (e) a balanced signal circuit including said photoelectrical cell and adapted to produce an error signal having a direction and amplitude corresponding to the variation in light received by said photoelectric cell resulting from the lateral deviation of said line from said normal course, (f) said signal circuit being connected to said bridge in such a manner that said error signal will energize one of said gates depending upon the direction of deviation of said line and for a period of time corresponding to the magnitude of said deviation to correspondingly change the speed and direction of said motive means.]

[21. The invention according to claim 20 further comprising capacitor timing means in said signal circuit for timing the energization of said gates.]

[22. The invention according to claim 20 in which said line is the longitudinal edge of said web, said sensing head is an edge sensing head comprising an inner photoelectric cell and an outer photoelectric cell, said light source producing an inner light beam reflected to said inner photoelectric cell, but normally obscured by said web, and an outer light beam reflected to said outer photoelectric cell, which is normally not obscured by said web.]

[23. The invention according to claim 20 further comprising means in said signal circuit for adjusting the longitudinal zone of non-sensitivity of said line by said sensing head.]

*24. An apparatus for spreading a web of cloth, having a longitudinal stripe thereon, on a surface, comprising:*

*(a) a frame relatively movable longitudinally above said surface,*

*(b) means for relatively moving said frame longitudinally above said surface,*

*(c) spreader means on said frame for spreading a web of cloth on said surface,*

*(d) a cloth carriage for supporting a cloth supply,*

*(e) means mounting said cloth carriage for reciprocal transverse movement of said frame,*

*(f) carriage motive means for reciprocably transversely moving said cloth carriage,*

*(g) guide means guiding a web of cloth from the cloth supply on said carriage to said spreader means,*

*(h) a stripe-sensing head mounted on said frame adjacent the path of said web between said guide means and said spreading means and adapted to sense the stripe on said web,*

*(i) means mounting said guide means on said frame for reciprocable transverse movement to move said web transversely of said sensing head,*

*(j) guide motive means for reciprocably transversely moving said guide means,*

*(k) guide control means responsive to said stripe sensing head to actuate said guide motive means to move said guide means in a direction to maintain said stripe in alignment with a normal course determined by said stripe sensing head,*

*(l) an edge-sensing head for sensing the edge of said web,*

*(m) link means connecting said edge-sensing head to said guide means for simultaneous transverse movement,*

*(n) edge-sensing control means responsive to said edge-sensing head to actuate said carriage motive means to move said carriage in a direction to maintain said edge on a normal longitudinal course.*

*25. The invention according to claim 24 further comprising a carrier, said edge-sensing head being fixed to said carrier, track means supporting said carrier for transverse movement, said link means connecting said carrier to said guide means.*

*26. The invention according to claim 25 in which said link means comprises arm means rigidly fixing said carrier to said guide means, said guide motive means comprising screw shaft means operatively coupled to said carrier and an electrical guide motor for driving said screw shaft means.*

*27. The invention according to claim 24 in which said carriage motive means comprises a reversible electrical carriage motor, and said guide motive means comprises a reversible electrical guide motor, said guide control means comprising a stripe-sensing electrical circuit connected to said guide motor and responsive to said stripe-sensing head, said edge-sensing control means comprising an edge-sensing electrical circuit connected to said carriage motor and responsive to said edge-sensing head, each of said sensing circuits being adapted to vary the speed and direction of said guide motor and said carriage motor, respectively, corresponding to the magnitude and direction of the error signals detected by said stripe-sensing head, and by said edge-sensing head, respectively.*

*28. The invention according to claim 27 in which said stripe-sensing head comprises a light source, and a left photoelectric cell and a right photoelectric cell spaced on opposite sides of said light source, said light source and said photoelectric cells being connected in said stripe-sensing circuit, so that deviations in the intensity of reflected light from the reflected light pattern of a predetermined stripe course on said web is converted into corresponding error signals causing said guide motor to restore said stripe to said normal course.*

*29. The invention according to claim 28 in which said light source is a single light source adapted to illuminate a single area of the surface of said web, said reflected light pattern received by both said photoelectric cells emanating from said single illuminated area.*

*30. The invention according to claim 29 in which said stripe-sensing head has a light-emitting opening, a left light-receiving opening and a right light-receiving opening spaced on opposite sides of said light-emitting opening, all of said openings facing said web path, said light source being adapted to direct an incident beam through said light-emitting opening upon a web in said web path, said left photoelectric cell being adapted to receive a reflected beam through said left receiving opening, said right photoelectric cell being adapted to receive a reflected beam through said right receiving opening.*

*31. The invention according to claim 30 in which said left light-receiving opening and said right light-receiving opening have longitudinal axes which substantially converge in said single illuminated area on the web moving past said stripe-sensing head in said web path.*

*32. The invention according to claim 28 further comprising a light-intensity control circuit in said stripe-sensing circuit adapted to receive a signal from at least one*

*of said photoelectric cells corresponding to the intensity of illumination received by said photoelectric cell, said intensity control circuit varying the voltage of said light source in response to said signal to maintain a light beam reflected from said web to said sensing head of substantially constant intensity.*

*33. The invention according to claim 28 in which said stripe-sensing circuit is set to operate when the area on one side of a line on said normal course is darker than the area on the other side of said line, and reversing switch means operative to re-set said stripe-sensing circuit to operate when the area on one side of said line is lighter than the area on the other side of said line.*

*34. The invention according to claim 24 further comprising an elongated striper head support member extending transversely of said frame in front of said web path, said stripe-sensing head being mounted for transverse adjustment upon said support member, means hingedly connecting one end of said support member to one side of said frame for swinging movement about a vertical axis, and means for latching the opposite end of said support member to the other side of said spreader frame.*

References Cited

The following references, cited by the Examiner, are of record in the patented file of this patent or the original patent.

UNITED STATES PATENTS

| | | | |
|---|---|---|---|
| 3,400,927 | 9/1968 | Martin et al. | 270—31 |
| 3,479,023 | 11/1969 | Martin et al. | 270—31 |
| 3,181,859 | 5/1965 | Sayles | 270—31 |
| 3,332,681 | 7/1967 | Gilbert | 270—31 |
| 3,490,674 | 1/1970 | Ott et al. | 226—19 |
| 3,431,425 | 3/1969 | Brown et al. | 250—219 DR |
| 3,105,908 | 10/1963 | Burkhardt et al. | 250—83.3 UV X |
| 3,468,529 | 9/1969 | Martin et al. | 270—31 |
| 3,461,302 | 8/1969 | Benson et al. | 250—219 DR |
| 2,082,634 | 6/1937 | Johnstone | 226—20 X |
| 3,432,672 | 3/1969 | Bessonny et al. | 250—219 DR |
| 2,506,053 | 5/1950 | Zuckerman | 226—18 X |
| 2,696,565 | 12/1954 | Smockley | 250—219 DR X |
| 2,961,548 | 11/1960 | Drell | 250—219 DR |

ROBERT W. MICHELL, Primary Examiner

A. HEINZ, Assistant Examiner